United States Patent
Tung et al.

(10) Patent No.: US 12,426,025 B2
(45) Date of Patent: Sep. 23, 2025

(54) METHOD FOR BANDWIDTH ALLOCATION

(71) Applicant: Ming Chi University of Technology, New Taipei (TW)

(72) Inventors: Yi-Chih Tung, New Taipei (TW); Yi-Nan Lin, New Taipei (TW); Yen-Chen Chen, New Taipei (TW)

(73) Assignee: MING CHI UNIVERSITY OF TECHNOLOGY, New Taipei (TW)

( * ) Notice: Subject to any disclaimer, the term of this patent is extended or adjusted under 35 U.S.C. 154(b) by 522 days.

(21) Appl. No.: 18/082,746

(22) Filed: Dec. 16, 2022

(65) Prior Publication Data

US 2023/0422226 A1 Dec. 28, 2023

(30) Foreign Application Priority Data

Jun. 23, 2022 (TW) .................................. 111123477

(51) Int. Cl.
*H04W 72/0453* (2023.01)
*H04W 76/15* (2018.01)

(52) U.S. Cl.
CPC ....... *H04W 72/0453* (2013.01); *H04W 76/15* (2018.02)

(58) Field of Classification Search
CPC . H04W 72/0453; H04W 76/15; H04W 16/14; H04W 72/0457
See application file for complete search history.

(56) References Cited

U.S. PATENT DOCUMENTS

| | | | | |
|---|---|---|---|---|
| 11,570,629 B2* | 1/2023 | Haija | ................ | H04L 5/0048 |
| 2009/0190518 A1* | 7/2009 | Kim | ................ | H04L 12/189 |
| | | | | 370/312 |
| 2009/0262671 A1* | 10/2009 | Seol | ................ | H04W 72/21 |
| | | | | 370/329 |
| 2014/0112242 A1* | 4/2014 | Vilmur | ................ | H04B 7/2606 |
| | | | | 370/327 |
| 2021/0076384 A1* | 3/2021 | MolavianJazi | ....... | H04L 5/0094 |
| 2021/0168619 A1* | 6/2021 | Park | ................ | H04W 72/0453 |
| 2022/0014935 A1* | 1/2022 | Haija | ................ | H04L 5/0048 |

(Continued)

FOREIGN PATENT DOCUMENTS

| | | |
|---|---|---|
| WO | 2021049907 A1 | 3/2021 |
| WO | 2022015965 A1 | 1/2022 |
| WO | 2022094905 A1 | 5/2022 |

OTHER PUBLICATIONS

Search Report appended to an Office Action, which was issued to Taiwanese counterpart application No. 111123477 by the TIPO on Apr. 10, 2023, with an English translation thereof.

*Primary Examiner* — Lewis G West

(74) *Attorney, Agent, or Firm* — Ohlandt, Greeley and Perle, L.L.P.

(57) ABSTRACT

A method for bandwidth allocation is to be implemented by a base station (BS) that communicates with a plurality of reconfigurable intelligent surfaces (RISs). The method comprising steps of: receiving a plurality of join messages respectively from a plurality of user equipments (UEs) via the RISs, the join messages being transmitted simultaneously by the UEs in a contention area according to a map message; and according to the join messages, grouping the UEs into at least one group by allocating a frequency band within the contention area to each of the at least one group, wherein those of the UEs in the same group share the same frequency band.

12 Claims, 5 Drawing Sheets

(56) References Cited

U.S. PATENT DOCUMENTS

| | | | |
|---|---|---|---|
| 2022/0052764 A1* | 2/2022 | Medra | H04B 10/614 |
| 2022/0232422 A1* | 7/2022 | Dai | H04W 72/21 |
| 2023/0188170 A1* | 6/2023 | Dutta | H04W 24/08 |
| | | | 375/346 |
| 2023/0284032 A1* | 9/2023 | Kim | H04W 16/14 |
| | | | 370/329 |
| 2023/0362847 A1* | 11/2023 | Ly | H04B 7/06952 |
| 2023/0422226 A1* | 12/2023 | Tung | H04W 72/0453 |
| 2024/0031044 A1* | 1/2024 | Kim | H04L 5/0048 |
| 2024/0244555 A1* | 7/2024 | Zhang | H04W 56/0045 |

* cited by examiner

METHOD FOR BANDWIDTH ALLOCATION

CROSS-REFERENCE TO RELATED APPLICATION

This application claims priority to Taiwanese Invention Patent Application No. 111123477, filed on Jun. 23, 2022.

FIELD

The disclosure relates to wireless communication, and more particularly to a method for bandwidth allocation.

BACKGROUND

With the development of wireless communication technology, data transfer volume also increases. However, radio spectrum is a finite resource, and collision may occur among multiple user equipments that are in same area and that use the same frequency band to transmit data at the same time.

SUMMARY

Therefore, an object of the disclosure is to provide a method for bandwidth allocation that can alleviate the problem mentioned above.

According to the disclosure, the method for bandwidth allocation is to be implemented by a base station (BS) that communicates with a plurality of reconfigurable intelligent surfaces (RISs). The method includes steps of:
  receiving a plurality of join messages respectively from a plurality of user equipments (UEs) via the RISs, the join messages being transmitted simultaneously by the UEs in a contention area according to a map message; and
  according to the join messages, grouping the UEs into at least one group by allocating a frequency band within the contention area to each of the at least one group, wherein those of the UEs in the same group share the same frequency band.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
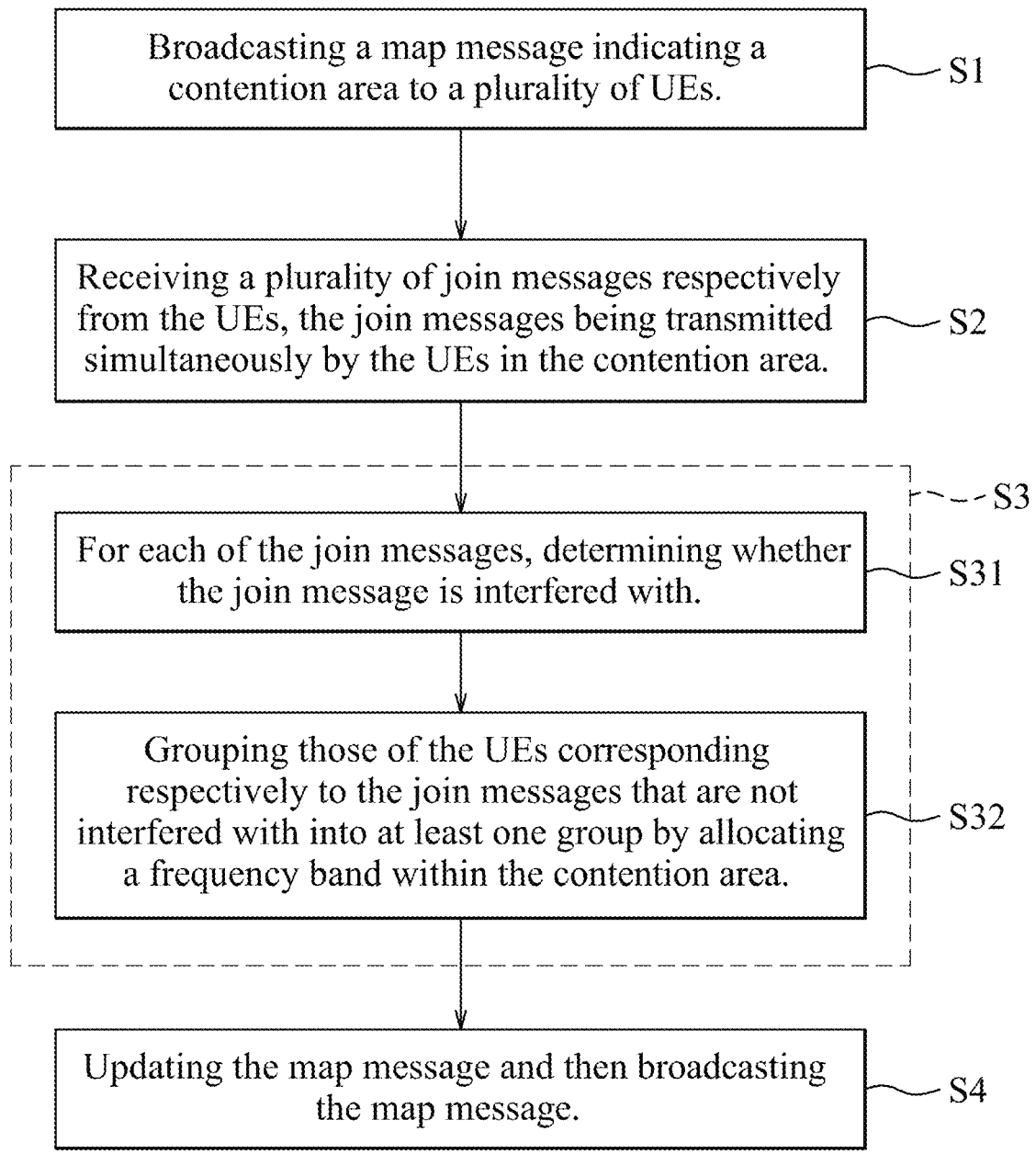
FIG. 1 is a flowchart illustrating an embodiment of a method for bandwidth allocation according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
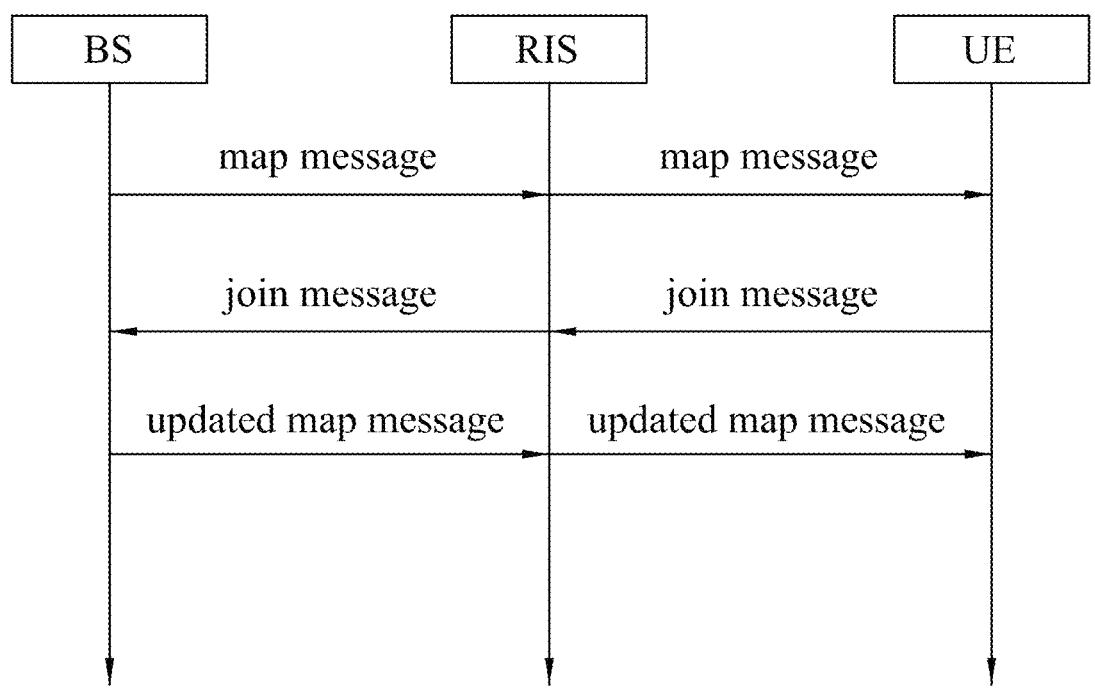
FIG. 2 is a schematic diagram illustrating communication among a base station, a reconfigurable intelligent surface and a user equipment.

Referring to FIGS. 1 and 2, an embodiment of a method for bandwidth allocation according to the disclosure is illustrated. The method is to be implemented by a base station (BS) that communicates with a plurality of reconfigurable intelligent surfaces (RISs). The method includes steps S1-S4.

In step S1, the BS broadcasts a map message to a plurality of user equipments (UEs) via the RISs. The map message indicates a contention area and includes a parameter allowing the UEs to respectively send a plurality of join messages to the BS simultaneously.

In step S2, the BS receives the join messages respectively from the UEs via the RISs. The join messages are transmitted simultaneously by the UEs in the contention area according to the map message. More specifically, each of the join messages has an identification code corresponding to one of the UEs that sends the join message, and indicates a frequency band within the contention area that the corresponding one of the UEs uses to send the join message. In a case that the contention area has a plurality of resource blocks (RBs), each of the join messages then indicates one of the RBs which the corresponding one of the UEs uses to send the join message.

It should be noted that the BS may receive various messages, for each of the messages received by the BS, the BS determines whether the message is a join message by determining whether a type field of the message indicates a type corresponding to the join message.

In step S3, according to the join messages, the BS then groups the UEs into at least one group by allocating a frequency band within the contention area to each of the at least one group. Those of the UEs in the same group share the same frequency band.

More specifically, step S3 includes sub-steps of S31-S32.

In sub-step S31, for each of the join messages, the BS determines whether the join message is interfered with.

In sub-step S32, the BS only groups those of the UEs corresponding respectively to the join messages that are not interfered with (hereinafter referred to as "to-be-grouped UEs"). More specifically, the BS groups the to-be-grouped UEs with reference to the identification codes respectively of the to-be-grouped UEs according to the frequency band which the to-be-grouped UEs use to send the join messages. The BS identifies the to-be-grouped UEs that send the join message according to the identification codes in the join messages, and groups the to-be-grouped UEs using the same frequency band to send the join messages into one group.

Due to characteristics of the wireless network, collision occurs when the UEs in a cell of the same RIS (an area served by the RIS is called a "cell") use the same frequency and send the join messages at the same time. Therefore, according to the disclosure, the UEs in the cell of the same RIS are not to be grouped into the same group. In other words, the UEs in the same group are in the cells of different RISs, respectively.

In Step 4, the BS updates the map message to make the map message have information of at least one frequency band respectively allocated to the at least one group, and then broadcasts the updated map message to the UEs via the RISs.

Figure 3:
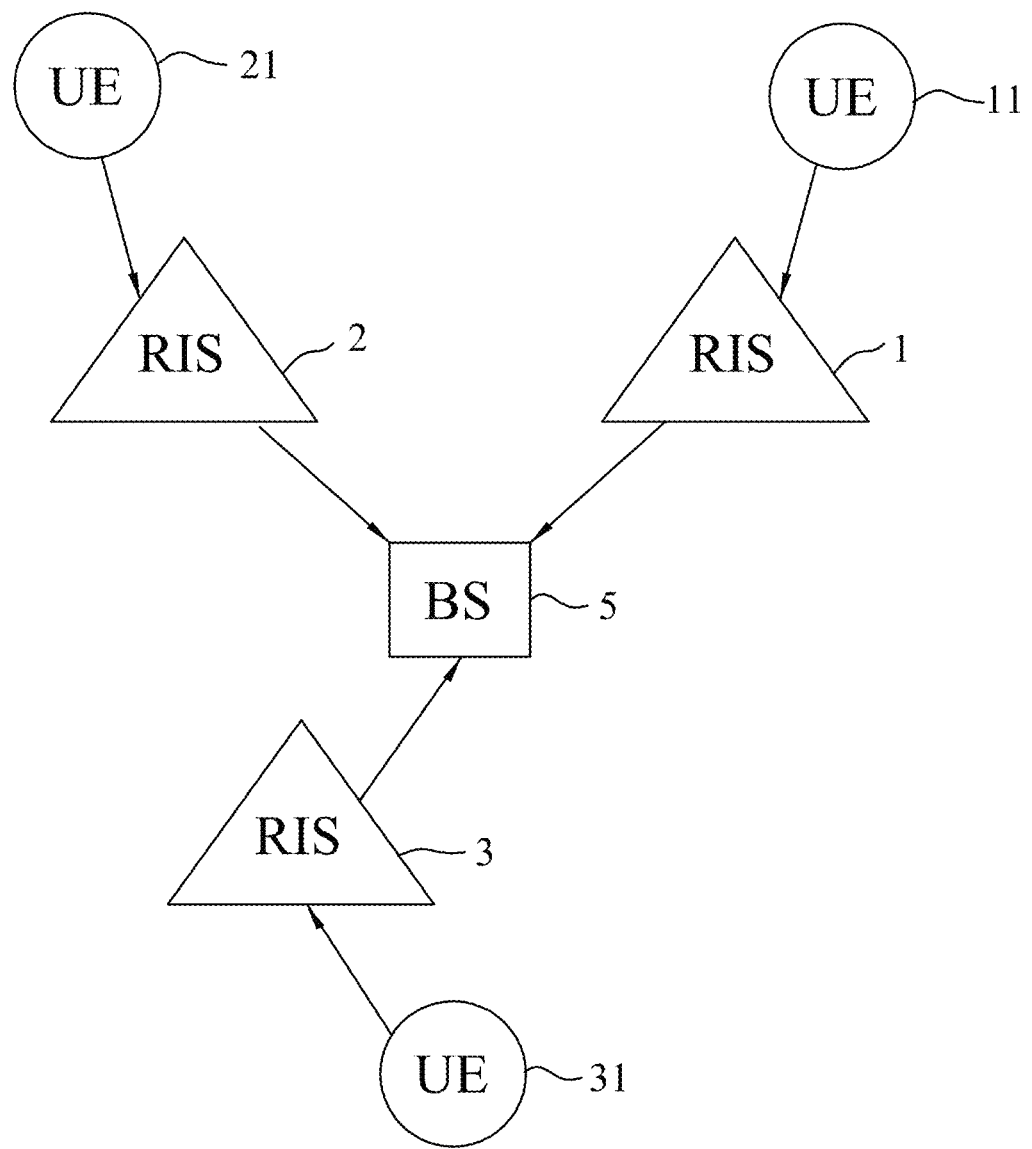
FIG. 3 is a block diagram illustrating an example of bandwidth allocation in a wireless communication system using the method according to an embodiment of the disclosure.

Referring to FIG. 3, a first example of bandwidth allocation in a wireless communication system using the method for bandwidth allocation according to an embodiment of the disclosure is illustrated. In the first example, the wireless communication system includes a BS 5 that is configured to implement the method of this disclosure, a plurality of RISs 1, 2, 3 that communicate with the BS 5, and a plurality of UEs 11, 21, 31 that communicate with the BS 5 via the RISs 1, 2, 3. The UE 11 is in a cell of the RIS 1; the UE 21 is in a cell of the RIS 2; the UE 31 is in a cell of the RIS 3.

For example, the BS 5 broadcasts the map message indicating the contention area that has only one RB to the UEs 11, 21, 31 via the RISs 1, 2, 3 (step S1). The UEs 11, 21, 31 uses the one RB to send the join messages simultaneously. Because the UEs 11, 21, 31 are not in the same cell of one RIS, the join messages sent by the UEs 11, 21, 31 will not be interfered with, and the BS 5 will group the UEs 11, 21, 31 into one group (step S3) and then update the map message and broadcast the updated map message (step S4). Specifically, the UEs 11, 21, 31 that are grouped into the same group will share the one RB.

Figure 4:
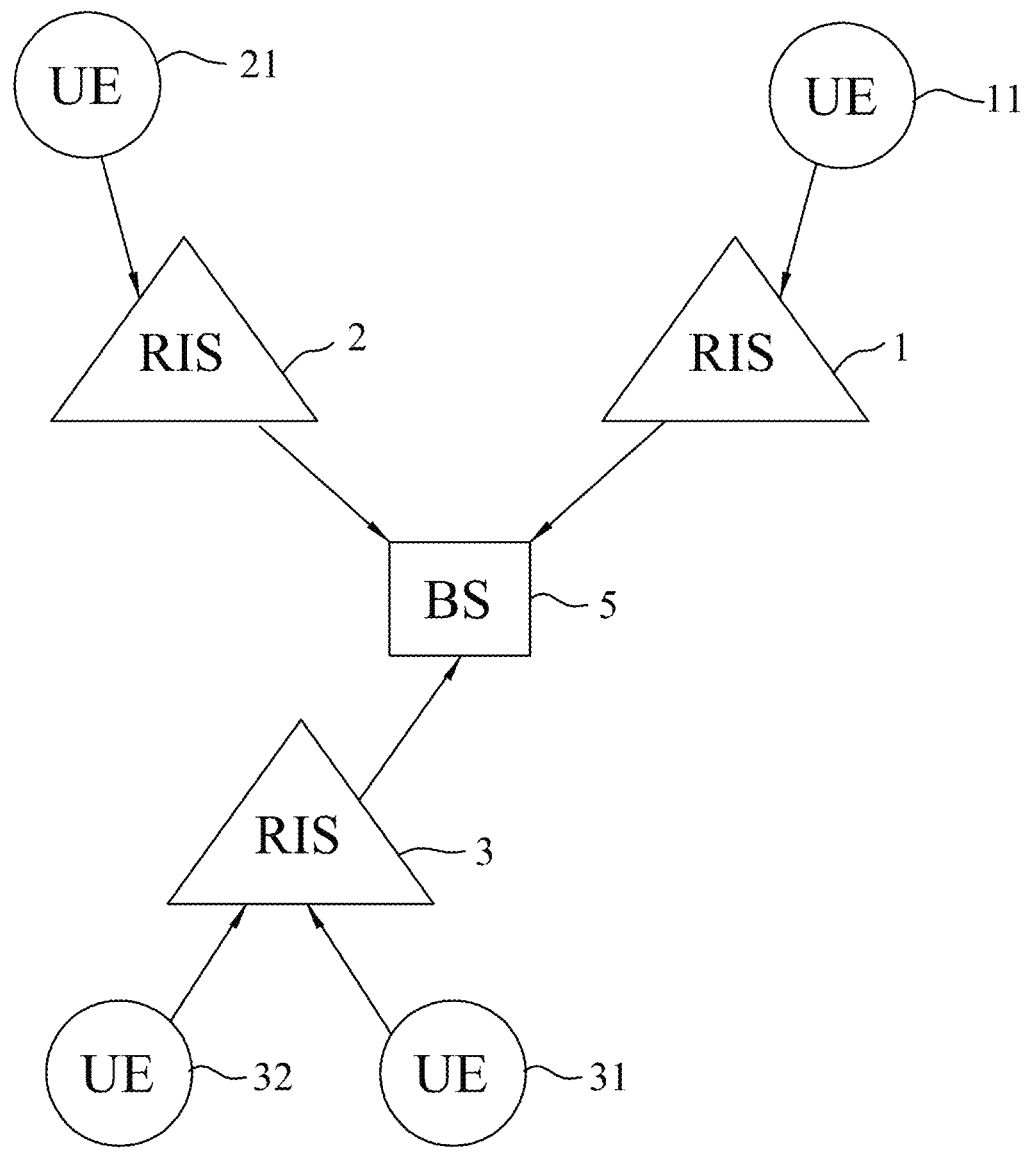
FIG. 4 is a block diagram illustrating another example of bandwidth allocation in a wireless communication system using the method according to an embodiment of the disclosure.

Referring to FIG. 4, a second example of bandwidth allocation in a wireless communication system using the method according to an embodiment of the disclosure is illustrated. Compared with the first example, the wireless communication system in the second example further includes another UE 32 in the cell of the RIS 3.

For example, the BS 5 broadcasts the map message indicating the contention area that has only one RB to the UEs 11, 21, 31, 32 via the RISs 1, 2, 3. The UEs 11, 21, 31, 32 uses the one RB to send the join messages simultaneously. Because the UEs 11, 21 are not in the same cell of one RIS, the join messages that are received by the BS 5 respectively from the UEs 11, 21 are not interfered with. However, the UEs 31, 32 are both in the cell of the RIS 3, so the join messages that are received by the BS 5 respectively from the UEs 31, 32 will be interfered with. Therefore, the BS 5 only groups the UEs 11, 21 into one group by allocating the one RB to the UEs 11, 21 and then the BS 5 updates the map message and broadcast the updated map message.

When the BS 5 broadcasts the map message indicating the contention area that has two RBs (RB 1, RB 2) to the UEs 11, 21, 31, 32. Each of the UEs 11, 21, 31, 32 randomly selects one of the RBs and uses the one of the RBs to send the join message. For example, the UE 11 and the UE 31 select the RB 1, and the UE 21 and the UE 32 select the RB 2 such that the join messages that are received by the BS 5 respectively from the UEs 11, 21, 31, 32 are not interfered with. Accordingly, the BS 5 groups the UEs 11, 21, 31, 32 according to the received join messages, each indicating the corresponding one of the UEs 11, 21, 31, 32 and the RB which the corresponding one of the UEs 11, 21, 31, 32 uses to send the join message. Specifically, the BS 5 groups the UE 11 and the UE 31 into one group by allocating the RB 1 to this group, and groups the UE 21 and the UE 32 into the other group by allocating the RB 2 to this group. In some embodiments, the number of the RBs, which may also be the number of the groups, equals to the maximum number of the UEs in the cell of the same RIS, such that the UEs in the same RIS may not interfere with one another.

Figure 5:
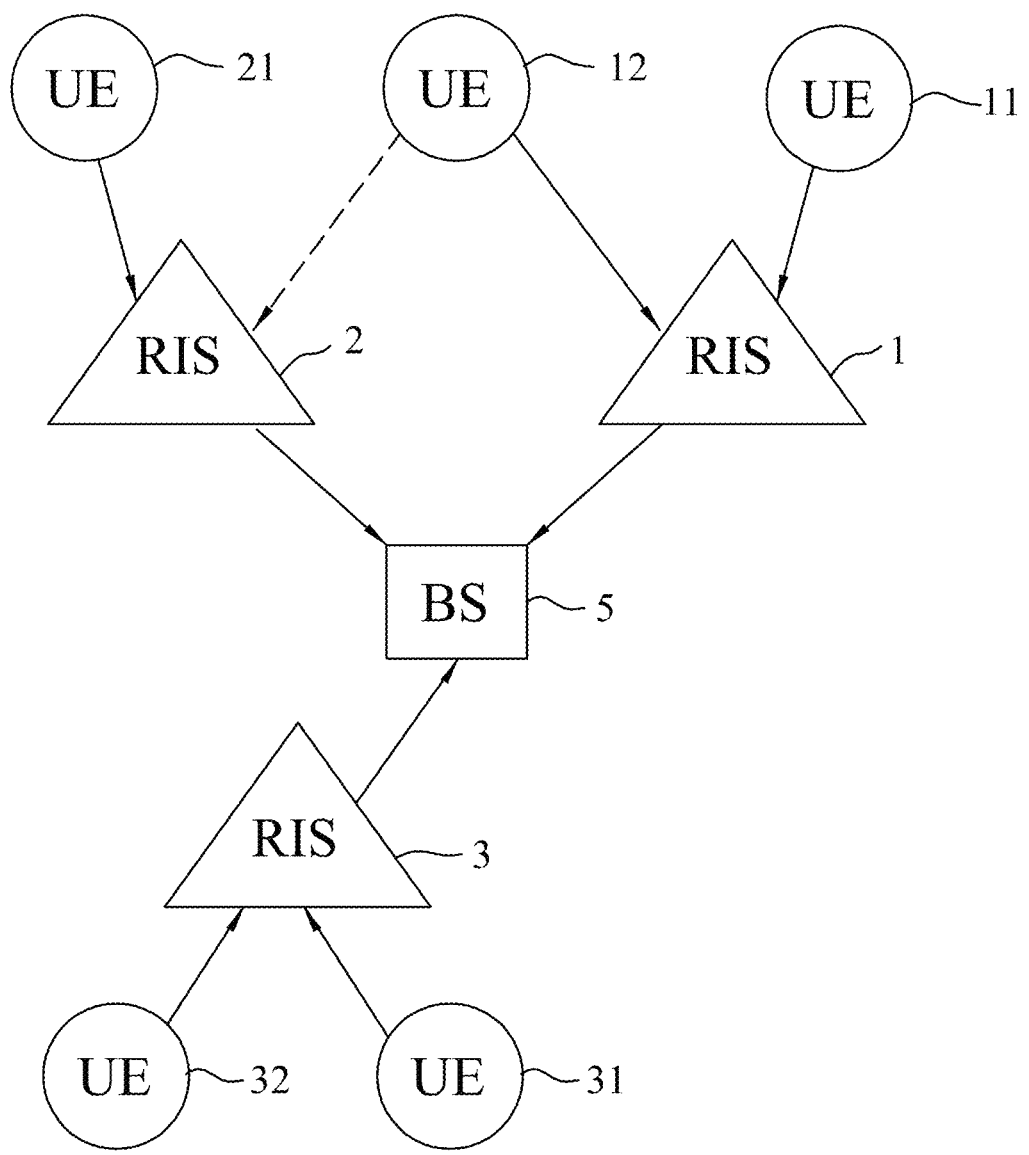
FIG. 5 is a block diagram illustrating yet another example of bandwidth allocation in a wireless communication system using the method according to an embodiment of the disclosure

Referring to FIG. 5, a third example of bandwidth allocation in wireless communication system using the method according to an embodiment of the disclosure is illustrated. Compared with the second example, the wireless communication system in the third example further includes another UE 12 that is both in the cell of the RIS 1 and the cell of the RIS 2.

For example, the BS 5 broadcasts the map message indicating the contention area that has two RBs (RB 1, RB 2) to the UEs 11, 12, 21, 31, 32. Each of the UEs 11, 12, 21, 31, 32 randomly selects one of the RBs so as to send the join message to the BS 5. For example, the UE 11 and the UE 31 select the RB 1, and the UE 12, the UE 21 and the UE 32 select the RB 2. Because the UE 12 is both in the cell of the RIS 1 and the cell of the RIS 2, the join message sending from the UE 12 to the BS 5 via the RIS 1 is not interfered with, but the join message sending from the UE 12 to the BS 5 via the RIS 2 is interfered with the join message sent from the UE 21 via the RIS 2. Therefore, the BS 5, according to the received join messages, then groups the UE 11 and the UE 31 into one group by allocating the RB 1 to this group, and groups the UE 12 and the UE 32 into the other group by allocating the RB 2 to this group.

In sum, the disclosure uses spatial diversity (i.e., if the RISs are far apart, the join messages via different RISs will not be interfered with even the UEs sending the join messages use the same frequency band to send the join messages simultaneously) to group the UEs into at least one group such that those of the UEs in the same group may share the same frequency band. Therefore, the data transfer volume may be increased and bandwidth efficiency may be improved. Furthermore, compared with conventional method of bandwidth allocation, the disclosure provides a method that involves less computational complexity.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for bandwidth allocation to be implemented by a base station (BS) that communicates with a plurality of reconfigurable intelligent surfaces (RISs), the method comprising steps of:

receiving a plurality of join messages respectively from a plurality of user equipments (UEs) via the RISs, the join messages being transmitted simultaneously by the UEs in a contention area according to a map message; and according to the join messages, grouping the UEs into at least one group by allocating a frequency band within the contention area to each of the at least one group, wherein those of the UEs in the same group share the same frequency band.

2. The method as claimed in claim 1, further comprising a step, before the step of receiving a plurality of join messages, of:

broadcasting the map message to the UEs via the RISs, the map message indicating the contention area.

3. The method as claimed in claim 1, wherein the step of grouping the UEs includes sub-steps of:

for each of the join messages, determining whether the join message is interfered with; and grouping those of the UEs corresponding respectively to the join messages that are not interfered with.

4. The method as claimed in claim 1, each of the join messages having an identification code corresponding to one of the UEs that sends the join message, wherein the step of grouping the UEs is to group the UEs with reference to the identification codes respectively of the UEs.

5. The method as claimed in claim 1, wherein the method further comprising a step, after the step of grouping the UEs, of:

updating the map message to make the map message have information of at least one frequency band respectively allocated to the at least one group, and then broadcasting the map message thus updated to the UEs via the RISs.

6. The method as claimed in claim 1, the contention area having a plurality of resources blocks (RBs), each of the join messages indicating one of the RBs which the corresponding one of the UEs uses to send the join message, wherein the step of grouping the UEs is to group those of the UEs that use the same RB to send the join messages into one group.

7. A bandwidth-allocating system comprising:

a plurality of reconfigurable intelligent surfaces (RISs); and a base station (BS) that communicates with said RISs and is configured to receive a plurality of join messages respectively from a plurality of user equipments (UEs) via said RISs, the join messages being transmitted simultaneously by the UEs in a contention area according to a map message; and according to the join messages, group the UEs into at least one group by allocating a frequency band within the contention area to each of the at least one group, wherein those of the UEs in the same group share the same frequency band.

8. The bandwidth-allocating system as claimed in claim 7, said BS is further configured to, before receiving a plurality of join messages, broadcast the map message to the UEs via said RISs, the map message indicating the contention area.

9. The bandwidth-allocating system as claimed in claim 7, wherein said BS is configured to group the UEs by:

for each of the join messages, determining whether the join message is interfered with; and grouping those of the UEs corresponding respectively to the join messages that are not interfered with.

10. The bandwidth-allocating system as claimed in claim 7, each of the join messages having an identification code corresponding to one of the UEs that sends the join message wherein the BS is configured to group the UEs by grouping the UEs with reference to the identification codes respectively of the UEs.

11. The bandwidth-allocating system as claimed in claim 7, wherein said BS is further configured to, after grouping the UEs, update the map message to make the map message have information of at least one frequency band respectively allocated to the at least one group, and then broadcast the map message thus updated to the UEs via said RISs.

12. The bandwidth-allocating system as claimed in claim 7, the contention area having a plurality of resources blocks (RBs), each of the join messages indicating one of the RBs which the corresponding one of the UEs uses to send the join message, wherein said BS is configured to group the UEs by grouping those of the UEs that use the same RB to send the join messages into one group.

\* \* \* \* \*